(12) United States Patent
Mozipo et al.

(10) Patent No.: US 9,652,006 B2
(45) Date of Patent: May 16, 2017

(54) POWER MANAGEMENT IN A DISCRETE MEMORY PORTION

(75) Inventors: Aurelien T. Mozipo, Olympia, WA (US); Charles R. Martin, Renton, WA (US); John D. Schock, Lakewood, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/997,169

(22) PCT Filed: Dec. 21, 2011

(86) PCT No.: PCT/US2011/066582
§ 371 (c)(1),
(2), (4) Date: May 22, 2014

(87) PCT Pub. No.: WO2013/095456
PCT Pub. Date: Jun. 27, 2013

(65) Prior Publication Data
US 2014/0351608 A1    Nov. 27, 2014

(51) Int. Cl.
*G06F 1/26* (2006.01)
*G06F 1/32* (2006.01)

(52) U.S. Cl.
CPC ............... *G06F 1/26* (2013.01); *G06F 1/266* (2013.01); *G06F 1/3275* (2013.01); *Y02B 60/1228* (2013.01); *Y02B 60/32* (2013.01)

(58) Field of Classification Search
CPC ..... G06F 1/32; G06F 1/14; G06F 1/12; G06F 9/3203; G06F 9/45558; G06F 1/3275; G06F 13/1694; G06F 1/3225; G06F 13/1668; G06F 13/1657

USPC .......................................................... 713/300
See application file for complete search history.

(56) References Cited

U.S. PATENT DOCUMENTS

| | | | |
|---|---|---|---|
| 6,038,673 A | 3/2000 | Benn et al. | |
| 7,590,815 B1 | 9/2009 | De Waal | |
| 2005/0091481 A1* | 4/2005 | Bogin | G06F 1/24 713/1 |
| 2006/0179334 A1* | 8/2006 | Brittain et al. | 713/320 |
| 2006/0248355 A1* | 11/2006 | Thayer | 713/300 |
| 2008/0005516 A1* | 1/2008 | Meinschein et al. | 711/165 |
| 2008/0059820 A1 | 3/2008 | Vaden et al. | |
| 2008/0082751 A1* | 4/2008 | Okin et al. | 711/115 |

(Continued)

FOREIGN PATENT DOCUMENTS

CN    1332862 A    1/2002
WO    2013/095456 A1    6/2013

OTHER PUBLICATIONS

International Preliminary Report on Patentability and Written Opinion received for PCT Patent Application No. PCT/US2011/066582, mailed on Jul. 3, 2014, 6 pages.

(Continued)

*Primary Examiner* — Thomas Lee
*Assistant Examiner* — Santosh R Poudel
(74) *Attorney, Agent, or Firm* — Jordan IP Law, LLC

(57) ABSTRACT

Systems and methods of operating a computing system may involve receiving, at a control interface, an instruction to alter a power state at a memory device, and directing, by the control interface, a controller to control a power supply to a memory device channel to alter the power state in the memory device.

7 Claims, 3 Drawing Sheets

(56) References Cited

U.S. PATENT DOCUMENTS

| | | |
|---|---|---|
| 2008/0082779 A1* | 4/2008 | Ogasawara et al. .......... 711/170 |
| 2008/0313482 A1 | 12/2008 | Karlapalem et al. |
| 2009/0070612 A1 | 3/2009 | Adelman et al. |
| 2009/0190429 A1* | 7/2009 | Brittain et al. ............. 365/233.1 |
| 2010/0005349 A1* | 1/2010 | Ferraiolo et al. ............. 714/704 |
| 2010/0034025 A1* | 2/2010 | Yanagidaira et al. ... 365/185.18 |
| 2010/0191999 A1 | 7/2010 | Jeddeloh |
| 2010/0250981 A1* | 9/2010 | Pamley ................. G06F 1/3203 713/320 |
| 2010/0257379 A1* | 10/2010 | Wang et al. ................... 713/300 |
| 2010/0281276 A1* | 11/2010 | Chang .................. G06F 1/3203 713/300 |
| 2010/0293410 A1* | 11/2010 | Bland et al. ...................... 714/8 |
| 2010/0332862 A1* | 12/2010 | Lester et al. .................. 713/300 |
| 2011/0148923 A1* | 6/2011 | Sadowski et al. ............ 345/634 |
| 2011/0235459 A1* | 9/2011 | Ware et al. ............. 365/233.11 |
| 2011/0255323 A1* | 10/2011 | Otsuka et al. ................... 365/63 |
| 2011/0320751 A1* | 12/2011 | Wang et al. ................... 711/157 |
| 2012/0066444 A1* | 3/2012 | Sadowski et al. ............ 711/105 |
| 2012/0079290 A1* | 3/2012 | Kumar et al. ................ 713/300 |
| 2012/0102344 A1* | 4/2012 | Kocev ................... G06F 1/3237 713/322 |
| 2012/0144144 A1* | 6/2012 | Worthington et al. ....... 711/165 |

OTHER PUBLICATIONS

International Search Report and Written Opinion received for PCT application No. PCT/US2011/066582, mailed on Aug. 14, 2012, 10 pages.

Office Action for German Patent Application No. 112011106017.3, mailed Apr. 19, 2016, 12 pages including 5 pages of English translation.

Office Action for Chinese Patent Application No. 201180075823.5, mailed on Aug. 19, 2016, 7 pages including 4 pages of English translation.

Office Action for U.S Appl. No. 15/051,073, mailed on Sep. 9, 2016, 15 pages.

Office Action for U.S. Appl. No. 15/051,073, mailed Mar. 6, 2017, 20 pages.

* cited by examiner

POWER MANAGEMENT IN A DISCRETE MEMORY PORTION

BACKGROUND

Technical Field

Embodiments generally relate to power management. More particularly, embodiments relate to implementing power management in a discrete memory portion.

Discussion

Power management may be a significant design consideration in memory design. A typical server may include a processor coupled to a plurality of memory riser units. When offlining memory, the server typically may only offline all of the memory riser units. This may lead to unnecessary power usage.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may include a system including a non-volatile memory (NVM) to store a basic/input output system (BIOS), a system memory to store an operating system (OS) and an software application, and a first primed circuit board (PCB) including a memory device. The system may also include a second printed circuit board (PCB) including a processing component having a logic unit, a memory controller, a control unit, and a register. The second printed circuit board may also include a partial memory management component having a control interface a controller, and a memory device channel, wherein the control interface directs the controller to control a power supply to the memory device channel to alter a power state in the memory device.

Embodiments may also include an apparatus including a processing component including a memory controller. The apparatus may also include a control interface to receive a command to alter a power state in a memory device, and a controller to, upon direction from the control interface, control a power supply to at memory device channel to alter the power state in the memory device.

Additional embodiments may include a computer implemented including receiving, at a control interface, an instruction to alter a power state at a memory device. The method may also provide for directing, by the control interface, a controller to control a power supply to a memory device channel to alter the power state hi the memory device.

In addition, embodiments may include a computer readable storage medium including a set of instructions, which if executed by a processor, cause a computer to receive, at a control interface, an instruction to alter a power state at a memory device. The instructions may also cause a computer to direct, by the control interface, a controller to control a power supply to a memory device channel to alter the power state in the memory device.

Figure 1:
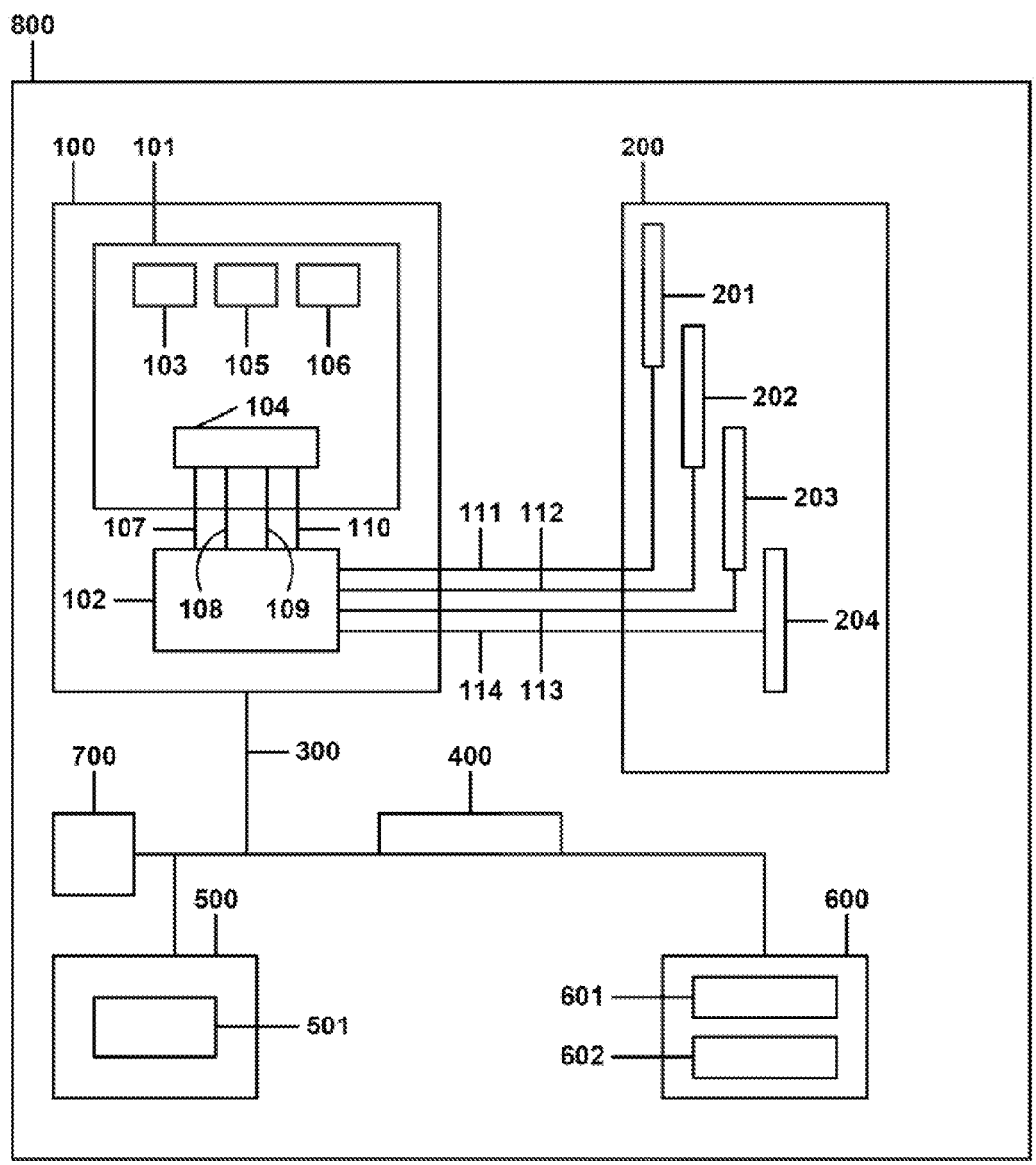
FIG. 1 is a block diagram of an example of a computing system that implements power management in a discrete memory portion in accordance with an embodiment of the invention.

Turning now to FIG. 1, a block diagram of a computer server system 800 is shown. The computer server system 800 may include a first printed circuit hoard (PCB) 100, a second PCB 200, a bus 300, a PCI (Peripheral Component Interconnect) card 400, a Read-Only Memory (ROM) 500, a system memory 600, and a hard disk 700.

The first PCB 100 may include a processing component 101 and a partial memory management component 102. The processing component 101 may include a logic unit 103, a memory controller 104, a control unit 105, and a register 106. The memory controller 104 may be coupled to the partial memory management component 102 by a first memory controller interface 107, a second memory controller interface 108, a third memory controller interlace 109, and a fourth memory controller interface 110.

The second PCB 200 may include a first dual in-line memory module (DIMM) 201, a second DIMM 202, a third DIMM 203, and a fourth DIMM 204. The first DIMM 201, the second DIMM 202, the third DIMM 203, and the fourth DIMM 204 may be coupled to the partial memory management component 104 by a first memory channel output 111, a second memory channel output 112, and a third memory channel output 113, and a fourth memory channel output 114, respectively.

The bus 300 and the PCI card 400 may be utilized to transfer data inside the computer server system 800. The ROM 500 may be a non-volatile storage device, and may store, among other things, a basic input/output system (BIOS) 501. The BIOS 501 may be built into the ROM 500, and may be the first software code run when the computer server system 800 is powered on. The system memory 600 may be a primary volatile storage device that may store, among other things, an operating system (OS) 601 and an application program 602. The hard disk 700 may be a second volatile memory device that may store data or application programs.

In embodiments of the present invention, a computer server system may be configured to implement power management in a discrete memory portion. Specifically, embodiments may be configured to control power supply (i.e., be configured to brought online and taken offline) to a computer server system memory component at an individual memory control channel level. For example, in the case of computer server system 800, the power supply to the DIMM 204 may be controllable at an individual memory controller channel level. The ability to control power to a memory device at an individual memory controller channel level may allow for, among other things, faster operations and more incremental increases and decreases (i.e., efficient) power usage.

The arrangement and numbering of blocks depicted in FIG. 1 is not intended to imply an order of operations to the exclusion of other possibilities. Those of skill in the art will appreciate that the foregoing systems and methods are susceptible of various modifications and alterations. For example, in the embodiment described in FIG. 1, the memory controller 104 and the partial memory management component 102 are located on the same printed circuit board, the first PCB 100. However, in other embodiments, the memory controller and the partial memory management component may be located on separate PCBs.

Figure 2:
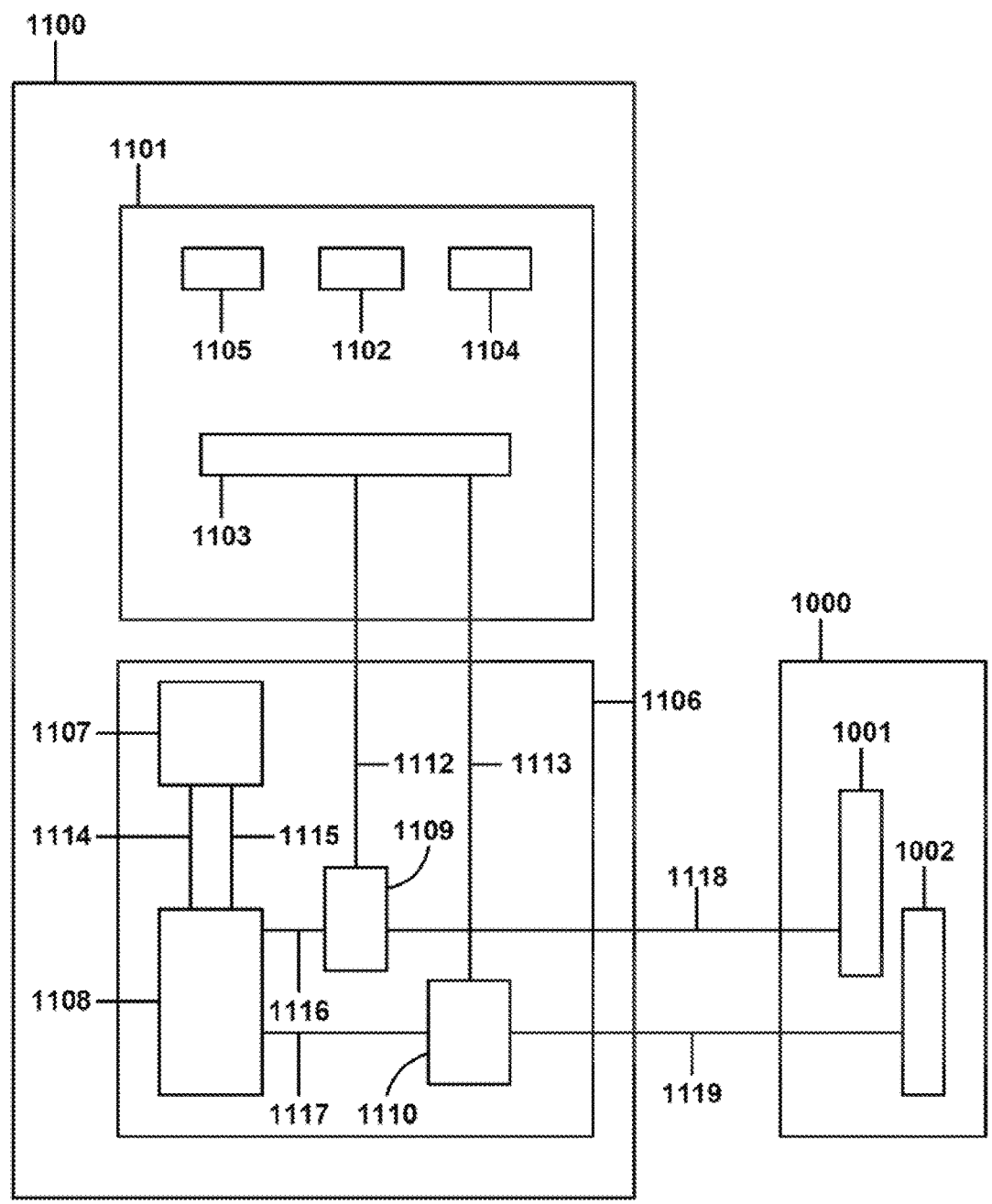
FIG. 2 is a block diagram of an example of a memory apparatus that implements power management in a discrete memory portion in accordance with an embodiment of the invention.

Turning now to FIG. 2, a detailed block diagram of a first PCB 1000 and a second PCB 1100 implementing power management in a discrete memory portion is shown. The first PCB 1000 and the second PCB 1100 may be located in a computer server system, such as the computer server system 800 (FIG. 1), already discussed. The first printed circuit board 1000 may include a first DIMM 1001 and a second DIMM 1002. The second printed circuit board 1100 may include a processing component 1101 and a partial memory management component 1106. The processing component 1101 may further include a logic unit 1102, a memory controller 1103, a control unit 1104, and a register 1105.

The partial memory management component 1106 may include a control interface 1107, a controller 1108, a first memory device channel 1109, and a second memory device channel 1110. The first memory device channel 1009 may be utilized to control to portions of a DIMM 1001 at an individual memory controller channel level. Similarly, the second memory device channel 1110 may be utilized to control to portions of a DIMM 1002 at an individual memory controller channel level. A first memory controller interlace 1112 and a second memory controller interface 1113 may couple the memory controller 1103 to the first memory device channel 1109 and the second memory device channel 1110 respectively.

The control interface 1107 may interface with a BIOS, such as BIOS 501 (FIG. 1), or with an OS, such as OS 601 (FIG. 1), to receive a command to control (i.e., alter) a power state of the first memory device channel 1109 or the second memory device channel 1110. The control interface 1107 may be, among other things, at least one of a hardware component, a programmable logic device (PLD), or a system management (SM) bus device. A first instruction interface 1114 and a second instruction interface 1115 may couple the control interface 1107 and the controller 1108.

The controller 1108 may be a controller that can control power (i.e., enable power or disable power) to the first memory device channel 1109 and the second memory device channel 1110. Upon receiving an instruction, the control interface 1107 may direct the controller 1108 (utilizing the first instruction interface 1114 and the second instruction interface 1115) regarding the desired power state of the first memory device channel 1109 and the second memory device channel 1110, individually and independent of any other memory controller channel. The controller 1108 may utilize a first memory device rail 1116 and a second memory device rail 1117 to control power to the first memory device channel 1109 and a second memory device channel 1110 respectively.

The DIMM 1001 and the DIMM 1002 of the second printed circuit board 1100 may be brought online or taken offline (i.e., the power states may be altered) at the memory controller channel level at different times during operation utilizing the first memory device channel 1109 and the second memory device channel 1110. For example, the DIMM 1001 and the DIMM 1002 may be brought online or taken offline at an individual memory controller channel level, during a power-on self test (POST) of a bootup process, upon instruction from a BIOS, such as the BIOS 501 (FIG. 1). Alternatively, the DIMM 1001 and the DIMM 1002 may be brought online or taken offline on an individual memory controller channel level during runtime by an OS, such as the OS 601 (FIG. 1).

So, in one embodiment, during runtime, the control interface 1107 may receive an OS instruction that the first memory device channel 1109 should be taken offline, while the second memory device channel 1110 should be brought online. The control interface 1107 may utilize the first instruction interface 1114 to direct a first signal to the controller 1108 to take the first memory device channel 1109 offline (i.e., a "disable" signal), and the second instruction interface 1115 to the controller 1108 to direct a second signal to bring the second memory device channel 1110 online an "enable" signal).

Upon receiving the first signal to disable the first memory device channel 1109, the controller 1108 may cut power to the first memory device rail 1116 to disable the first memory device channel 1109. Upon receiving the second signal to enable the second memory device channel 1110, the controller 1108 may power the second memory device rail 1117 to enable the second memory device channel 1110. A first memory channel output 1118 may couple the first memory device channel 1109 to the first DIMM 1001, and a second memory channel output 1119 may couple the second memory channel output 1118 may couple the second memory device channel 1110 to the second DIMM 1002.

Accordingly, in embodiments of the present invention, the power allocation to each of memory channel may be controlled individually, such that each memory channel may be enabled (or "re-initialized" or "brought online") or disabled or "powered down" or "taken offline") individually. This may be the case regardless of the amount of power that is being consumed overall in the computer server system.

The arrangement and numbering of blocks depicted in FIG. 2 is not intended to imply an order of operations to the exclusion of other possibilities. Those of skill in the art will appreciate that the foregoing systems and methods are susceptible of various modifications and alterations. For example, in the embodiment described in FIG. 2, the controller 1108 may utilize the first memory device rail 1116 and the second memory device rail 1117 to control the first memory device channel 1109 and a second memory device channel 1110 respectively. However, other embodiments may include multiple single-rail controllers that each utilizes a single memory device rail to control an individual memory device channel.

Figure 3:
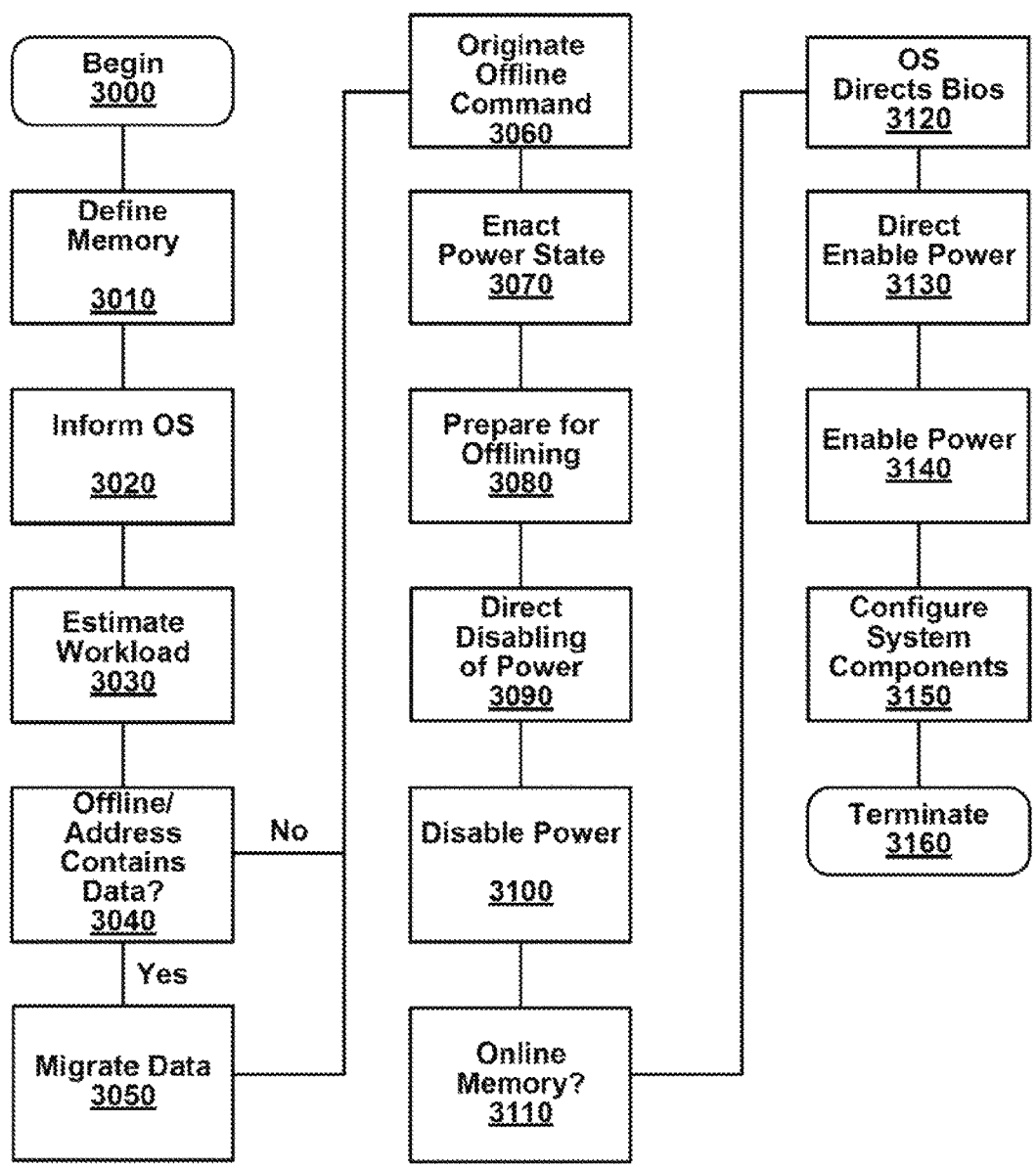
FIG. 3 is a flowchart of an example of a method of implementing power management in a discrete memory portion in accordance with an embodiment of the invention.

Turning now to FIG. 3, flowchart of an example of a method that implementing power management in a discrete memory portion in accordance with an embodiment of the invention is shown. The method might be implemented as a set of logic instructions stored in a machine- or computer-readable storage medium such as random access memory (RAM), read only memory (ROM), programmable ROM (PROM), firmware, flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASIC), complementary metal oxide semiconductor (CMOS) or transistor-transistor logic (TTL) technology, or any combination thereof. For example, computer program code to carry out operations shown in the method may be written in any combination of one or more programming languages, including an object oriented programming language such as Java, Smalltalk, C++ or the like and conventional procedural programming languages, such as the "C" programming language or similar programming languages.

The process may begin at processing block 3000. At processing block 3010, during bootup, a BIOS, such as BIOS 501 (FIG. 1), may determine and define a memory power node structure of a system, such as computer server system 800 (FIG. 1), which may represent the sections of memory in the system that may be switched into different power states independently of each other. As discussed above, in embodiments of the present invention, power to discrete portions of memory in the system may be controlled at a memory controller channel level. At processing block 3020, the BIOS may inform an OS, such as the OS 601 (FIG. 1), of the memory power node structure, so that the OS may also control discrete portions of memory in the system at a memory channel level (e.g., during runtime).

At processing block 3030, during runtime, the OS may estimate the system workload and determine present memory allocation needs to be freed (i.e., taken offline). At processing block 3040, in looking to take a particular memory address offline, the OS may determine whether the particular memory address presently contains data. If the particular memory address does not contain data, the process may proceed to processing block 3060. If an the other hand, the particular memory address does contain data, then at processing block 3050, the OS may migrate the data from the particular memory address to another memory address may to remain online.

At processing block 3060, the OS may issue a command to offline the particular memory address. At processing block 3070, the BIOS may configure a memory controller, such as memory controller 1103 (FIG. 2), to enact the specified power state (i.e., taking the particular memory address offline) in the system, and configure system components (e.g., memory controller registers, BIOS tables) to indicate that the particular memory address is being taken offline. At processing block 3080, the BIOS may interact with system components in preparation for the removal of power at the particular memory address (e.g., disabling clocks, asserting resets to affected components, etc).

At processing block 3090, the BIOS may direct a control interface, such as the control interface 1107 (FIG. 2), to remove power from the particular memory address. At processing block 3100, the control interface may utilize a controller, such as the controller 1108 (FIG. 2) and a memory device rail, such as the first memory device rail 1116 (FIG. 2), to disable a particular memory device channel, such as the first memory device channel 1109 (FIG. 2), thereby, taking the particular memory address offline at an individual memory channel level.

At processing block 3110, the OS may later determine that additional memory should be brought online. At processing block 3120, the OS may direct the BIOS to bring the particular memory channel hack online. At processing block 3130, the BIOS may direct the control interface to bring the particular memory device channel back online. At processing block 3140, the control interface may utilize the controller and the memory device rail to bring the particular memory device channel, and by extension, the particular memory address, back online. At processing block 3150, the BIOS may configure system components to indicate on the system address map that the particular memory address is active, and may inform the OS that the particular memory address is ready for use. At processing block 3160, the process may terminate.

The sequence and numbering of blocks depicted in FIG. 3 is not intended to imply an order of operations to the exclusion of other possibilities. Those of skill in the art will appreciate that the foregoing systems and methods are susceptible of various modifications, variations, and alterations. For example, in the embodiment described in FIG. 3, the BIOS 501 may determine and define a memory power node structure of a system dining bootup (i.e., processing block 3010). However, this may not necessarily be the case.

In other embodiment, the memory power node structure may be determined and defined by the OS during runtime.

It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

In addition, in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in it limiting manner. Rather, such added detail may be used in connection with one or more exemplary embodiments to facilitate easier understanding. Any represented signal lines, whether or not having additional information, may actually include one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

We claim:
1. A system comprising:
a non-volatile memory (NVM) to store a basic input/output system (BIOS);

a system memory to store an operating system (OS) and an software application;

a first printed circuit board (PCB) including a memory device; and a second printed circuit board (PCB) including, a processing component having a logic unit, a memory controller, a control unit, and a register; and a partial memory management component having a control interface selected from a programmable logic device (PLD) or a system management (SM) bus device, a controller, and a memory device channel coupled to the memory device, wherein the control interface is to direct the controller to control a power supply to the memory device channel to offline the memory device and the BIOS is to disable, prior to the memory device being offlined, one or more clocks associated with the memory device and wherein the controller and/or the BIOS is to indicate on a system address map whether an address associated with the memory device is active and, if the address is active, inform an operating system (OS) that the address is ready for use and bring the memory device back to online.

2. The system of claim 1, wherein a memory controller interface couples the memory controller to the memory device channel.

3. The system of claim 1, wherein a memory device rail couples the controller to the memory device channel.

4. The system of claim 1, wherein an instruction interface couples the control interface to the controller.

5. The system of claim 1, wherein the control interface receives a command to alter a power state of the memory device from the basic input/output system (BIOS).

6. The system of claim 1, wherein the control interface receives a command to alter a power state of the memory device from the operating system (OS).

7. The system of claim 1, wherein the control interface controls power to the memory device channel individually and independent of any other memory device channel.

* * * * *